C. A. KUNZ.
VALVED COUPLING.
APPLICATION FILED DEC. 15, 1913.

1,115,945.

Patented Nov. 3, 1914.

Charles A. Kunz,
Inventor

Witnesses by C. A. Snow & Co.
Attorneys

UNITED STATES PATENT OFFICE.

CHARLES A. KUNZ, OF DUBUQUE, IOWA.

VALVED COUPLING.

1,115,945.   Specification of Letters Patent.   Patented Nov. 3, 1914.

Application filed December 15, 1913. Serial No. 806,857.

*To all whom it may concern:*

Be it known that I, CHARLES A. KUNZ, a citizen of the United States, residing at Dubuque, in the county of Dubuque and State of Iowa, have invented a new and useful Valved Coupling, of which the following is a specification.

The present invention appertains to a hose coupling, and aims primarily to provide a coupling of that character, embodying a valve arranged to be closed when the coupling is opened or the members thereof detached.

It is the object of the present invention to provide a coupling of the nature indicated, embodying two members or sections adapted to be readily attached and detached, in combination with a unique and novel valve disposed within one of the members to close the passage therethrough when the coupling members are detached, and means carried by the other coupling member for forcibly opening the valve when the two coupling members are attached.

A further object of the present invention is to provide a valve of the nature stated, and a valve opening member, which may be readily applied within the coupling members, so as to coöperate when the valve members are attached.

It is also within the scope of the present invention to provide a coupling of the character specified, which shall be comparatively simple, substantial, durable and inexpensive in construction, as well as being simple, convenient, practical and efficient in its use.

With the foregoing general objects outlined, and with the other objects in view, which will be apparent as the nature of the invention is better understood, the present invention resides in the combination and arrangement of parts and in the details of construction hereinafter described and claimed, it being understood that changes in the precise embodiment of the invention herein disclosed can be made within the scope of what is claimed without departing from the spirit of the invention.

The invention has been illustrated in its preferred embodiment in the accompanying drawings, wherein:—

Figure 1:
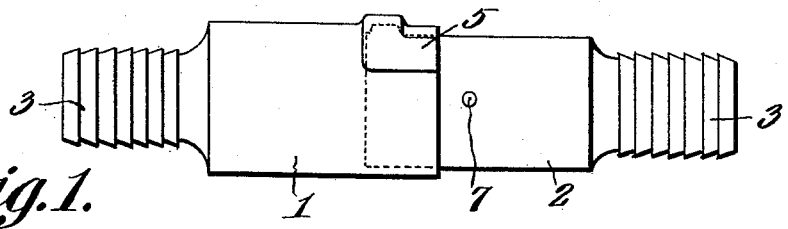
Figure 2:
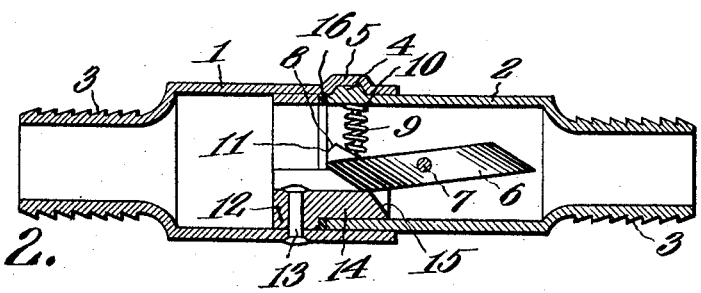
Figure 3:
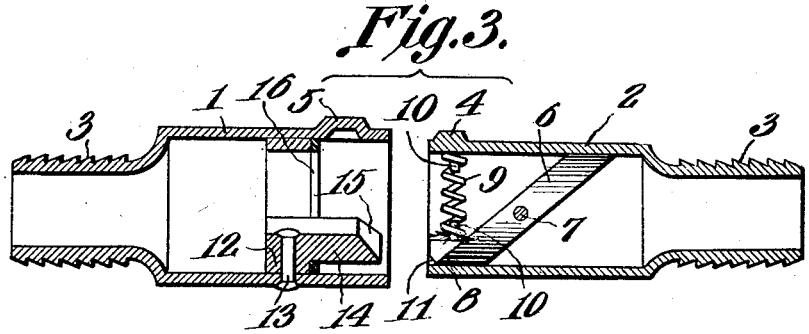
Figure 4:
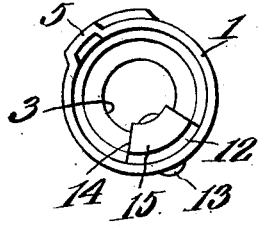
Figure 6:
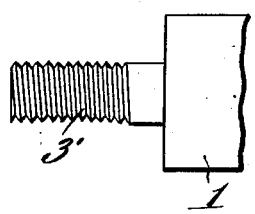
Figure 5:
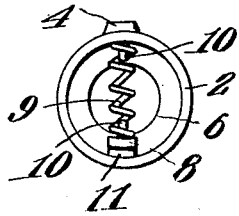

Figure 1 is a side elevation of the improved coupling with the members thereof attached. Fig. 2 is a longitudinal section through the coupling with the members attached. Fig. 3 is a view similar to Fig. 2, with the coupling members detached. Fig. 4 is an end view of one of the coupling members. Fig. 5 is an end view of the other coupling member. Fig. 6 is a fragmental elevation of one coupling member illustrating a slight modification or variation.

The present coupling embodies the female and male members or sections 1 and 2, respectively, which are cylindrical, or of circular cross section, as usual. The remote ends of the members 1 and 2 are provided with the hose attaching nipples 3, while the adjoining or meeting ends of the coupling members are provided with the lug 4 and bayonet slot 5, respectively, for locking the ends of the coupling members together, as will be apparent. The end of the coupling member 2 is arranged to be slipped or slid into the end or mouth of the coupling member 1, the lug 4 engaging within the bayonet slot 5 to hold the coupling members in engagement. The coupling members may be of any preferred construction or formation consistent with the structure hereinafter described.

In carrying out the present invention, an elliptical butterfly valve 6 is pivoted within the coupling member 2, a pivot pin 7 being passed loosely through the central portion of the valve 6, and having its terminals engaging through diametrically opposite portions of the coupling member 2 intermediate the ends of the coupling member. The periphery of the valve 6 is so formed, as to snugly fit the walls of the coupling member 2, when the valve is swung closed, the valve being disposed diagonally, when closed, as seen in Fig. 3. That face of the valve 6 facing the "inner" end or mouth of the coupling member 2, is provided with a lug 8 adjoining the inner end of the valve, and a coiled wire compression spring 9 is disposed between the lug 8 and opposite wall of the coupling member 2, within the mouth or inner end of the coupling member, the lug 8 and the opposite wall of the coupling member 2 against which the ends of the spring 9 seat, being preferably provided with fingers or projections 10 engaging within the ends or endmost convolutions of the spring to maintain the spring in operative position. As will be obvious, the tension of the spring 9 serves to close the valve when the valve is free. The lug 8 is provided with the bevel 11 extending to the end of the valve, whereby the valve will be forcibly opened when the coupling members are attached, as will hereinafter appear.

A ring or annulus 12 is secured within the coupling member 1, by means of rivets or other securing means 13, and is provided with an inwardly projecting, transversely curved tongue 14, having its end beveled, as at 15, whereby the tongue is in the form of a wedge. The tongue or wedge 14 is adapted to fit snugly within the coupling member 2, when the two coupling members are attached, and the ring or collar has a gasket or washer 16 seated thereagainst to form a tight joint with the end of the coupling member 2. The wedge 14 is so disposed with respect to the bayonet slot that it will properly engage the lug 8 of the valve when the two coupling members are attached.

In practice, the coupling members are applied to the hose section, as usual, to enable the hose sections to be readily coupled and uncoupled. When the coupling members are detached the valve 6 will be closed, under the influence of the spring 9, the coupling member 2 being attached to that hose section which is connected to a source of compressed air, or other pressure fluid. In this manner, when the coupling members are separated, the valve will be closed to prevent the discharge or escape of pressure fluid, the advantages of which are obvious. When the coupling members 1 and 2 are attached, the tongue or wedge 14 will encounter the bevel 11 of the lug 8, and consequently, the inner end of the valve will be wedged away from the adjoining wall of the coupling member 2, toward the coupling member 1 and against tension of the spring 9, whereby the valve will be opened, as illustrated in Fig. 2, to permit of the passage of the compressed air or other pressure fluid through the coupling. The tongue or wedge 14 being curved similar to the curvature of the walls of the coupling members, will permit of the slight rotary movements of the coupling members relative to each other, when they are coupled and uncoupled, without affecting the relation of the valve and the valve opening means.

As illustrated in Fig. 6, the coupling member 1 is provided with a reduced nipple 3' for the attachment of an air or riveting gun, or reamer. Thus, the air or riveting gun, or other fluid pressure implement, may be conveniently attached to and detached from the coupling member 2, without any escape of compressed air, when the air or riveting gun, or other device, is detached from the hose.

From the foregoing, the advantages and capabilities of the present device will be apparent to those skilled in the art, it being observed that the objects aimed at have been carried out satisfactorily, and that the present valve is stemless and threadless, which is highly desirable.

Having thus described the invention, what is claimed as new is:—

1. A coupling embodying two attachable members, a pivoted valve within one member and arranged to close the same when in a diagonal position, and a wedge carried by the other member and arranged to be wedged between one end of the valve and the wall of the first mentioned coupling member to swing the said end of the valve away from the said wall and toward the coupling member having the wedge, when the coupling members are attached.

2. A coupling embodying two attachable members, a butterfly valve pivoted within one coupling member and arranged to close the same when in a diagonal position, and a wedge carried by the other coupling member for wedging between one end of the valve and the wall of the first mentioned coupling member to swing the said end of the valve away from the said wall and toward the coupling member having the wedge, when the coupling members are attached.

3. A coupling embodying two attachable members, a pivoted butterfly valve within one coupling member and arranged to close the passage therethrough when in a diagonal position, a compression spring between one end of the valve and the opposite wall of the said coupling member, and means carried by the other coupling member for swinging the valve open when the coupling members are attached.

4. A coupling embodying two attachable members, a pivoted butterfly valve within one coupling member and arranged to close the passage therethrough when in a diagonal position, a compression spring between one end of the valve and the opposite wall of the said coupling member, and a projection carried by the other coupling member for engaging one end of the valve to open the same when the coupling members are attached.

5. A coupling embodying two attachable members, a pivoted butterfly valve within one coupling member and arranged to close the passage therethrough when in a diagonal position, a compression spring between one end of the valve and the opposite wall of the coupling member, and a wedge carried by the other coupling member to wedge between one end of the valve and the wall of the first mentioned coupling member when the coupling members are attached, to open the valve.

6. A coupling embodying two attachable members, a pivoted butterfly valve within one coupling member to close the same, one end of the valve having a beveled lug, and a member attached within the other coupling member and having a projecting wedge to engage between the said beveled lug and the wall of the first mentioned coupling member, when the coupling members are attached.

7. A coupling embodying two attachable members, a pivoted butterfly valve within one coupling member to close the same, one end of the valve having a beveled lug, a collar attached within the other coupling member and having a projecting wedge to engage between the said beveled lug and the wall of the first mentioned coupling member, when the coupling members are attached, and a compression spring disposed between the said lug and the opposite wall of the first mentioned coupling member.

8. A coupling embodying two attachable members, a pivoted butterfly valve within one coupling member to close the same and having a beveled lug at one end, and a ring secured within the other coupling member, and having a projecting transversely curved wedge to engage between the said beveled lug and the wall of the first mentioned coupling member, when the coupling members are attached.

9. A coupling embodying two attachable members, a pivoted butterfly valve within one coupling member to close the same and having a beveled lug at one end, and a ring secured within the other coupling member, and having a projecting transversely curved wedge to engage between the said beveled lug and the wall of the first mentioned coupling member, when the coupling members are attached, and a coiled wire compression spring disposed between the said lug and the opposite wall of the first mentioned coupling member.

In testimony that I claim the foregoing as my own, I have hereto affixed my signature in the presence of two witnesses.

CHARLES A. KUNZ.

Witnesses:
  A. KATH,
  M. DEMPSEY.

---

Copies of this patent may be obtained for five cents each, by addressing the "Commissioner of Patents, Washington, D. C."